April 8, 1930. W. A. BROWN Re. 17,637

EMERGENCY HEATER

Original Filed July 23, 1925 2 Sheets-Sheet 1

INVENTOR
William Allen Brown
BY
Herbert S. Fairbanks
ATTORNEY

April 8, 1930. W. A. BROWN Re. 17,637

EMERGENCY HEATER

Original Filed July 23, 1925 2 Sheets-Sheet 2

INVENTOR
William Allen Brown
BY
Herbert S. Fairbanks
ATTORNEY

Reissued Apr. 8, 1930 Re. 17,637

UNITED STATES PATENT OFFICE

WILLIAM ALLEN BROWN, OF PHILADELPHIA, PENNSYLVANIA

EMERGENCY HEATER

Original No. 1,620,432, dated March 8, 1927, Serial No. 45,536, filed July 23, 1925. Application for reissue filed December 15, 1928. Serial No. 326,392.

My invention relates to the general class of emergency heaters used for warming houses, apartments and the like, and which are usually bulky, unsightly, incommodious and unhandy, as compared with my present invention, which comprises a small, compact heater safely disposed so that the fire hazard is reduced to a minimum and heat or light may be instantly applied to the room by the turn of a switch. My novel combination may be used on wall brackets, table or floor lamps, being built into the aforesaid fixtures and not being applicable to ordinary lighting fixtures already built, and having the appearance to the casual observer of an ordinary lighting fixture.

In my novel invention I have disguised and collocated the heating element in such a manner, that the entire house could be heated in ordinary weather by the disposition of a number of these devices through the different rooms and halls and in temperate climates no other means of heating would be required.

To the above ends, my invention consists of a novel and useful combination of a flue or chimney surrounding a heating unit flanked by electric bulbs, the assembly being masked with a lamp shade, my invention however, not being limited to a single heating unit or electric bulb, as it may have a plurality of each or either in combination with one or more of the other, and the same may be collocated in other ways than that shown, without departing from the spirit of my invention.

For the purpose of illustrating my invention, I have shown in the accompanying drawings forms thereof which are at present preferred by me since they will, in practice, give satisfactory and reliable results, although it is to be understood that the various instrumentalities of which my invention consists can be variously arranged and organized and that my invention is not limited to the precise arrangements and organization of these instrumentalities as herein shown and described.

Referring to the drawings:—

Similar numerals of reference indicate corresponding parts in all figures.

Figure 5:
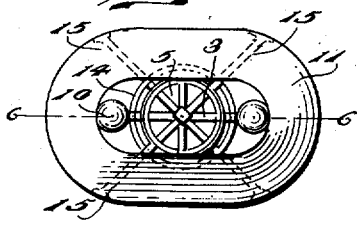
Figure 5, is a plan view of Figure 6.

1 represents an outer cylinder or chimney within which is shown an inner cylinder 2, and within the space 4 between the cylinders 1 and 2 I locate a layer or shell of resisting material 2′ which may be supported by the brackets 3 at top and bottom. This construction forms air spaces 4 for insulation and the openings 5 at the top and bottom of the cylinders are for the egress of heated air passing out at the cylinder top and for the ingress of the air to be heated entering at the bottom of the flue between the cylinders.

It will be evident that this outer chimney may be constructed of a single piece of insulating or heat resisting material such as mica, asbestos or it may be constructed of an outer cylinder of metal and an inner wall of asbestos or other insulating material, if desired, without departing from the spirit of my invention. At the junction of the lower brackets 3 is a socket 6 for an electric heating unit 7, whose electrode 8 is supported by enclosing bracket 9 having the contour seen in Figure 1, and the air moving through the surrounding insulated cylinder 1 is obviously brought to a high temperature by the unit 7.

Figure 4:
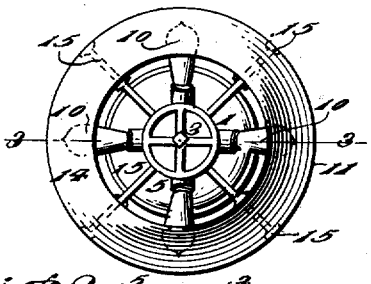
Figure 4 is a plan view of Figure 3.
Figure 6:
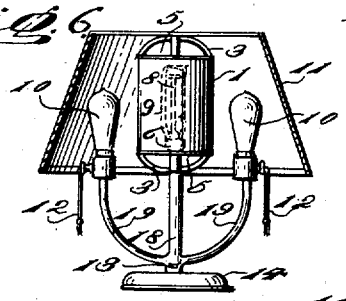
Figure 6, represents a vertical sectional view on line 6—6 of Figure 5, showing a table lamp, the shade only of which is in section.
Figure 3:
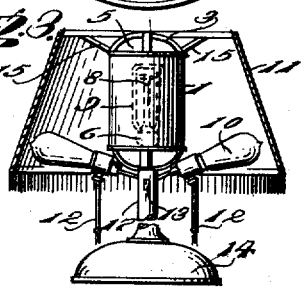
Figure 3, represents a vertical, sectional view of a complete floor lamp, the section being taken on line 3—3 of Figure 4, the shade only being in section.
Figure 1:
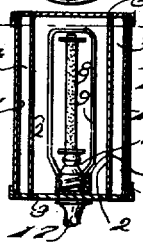
Figure 1, represents a vertical, sectional view of a heating unit and its flue embodying my invention, the section being taken on line 1—1 of Figure 2.

The heating unit and its cylinder above described is assembled with one or more electric light bulbs 10, as seen in Figures 3 and 4 and this assembly is masked by an ornamental exterior shade 11 which gives the appearance of an ordinary lighting lamp and disguises the heater 8 and its adjuncts contained therein. The electric lights and heating unit may be controlled by pull chains 12 or switches 13 or wall switches away from the devices as may be deemed necessary for their proper installation. The ornamental shade 11 is supported by brackets 15 at the top and bottom, and the brackets 3 may extend horizontally as seen in Figure 1 or they may be bowed or curved as seen in Figures 3, 6, 7 and 8.

Figure 7:
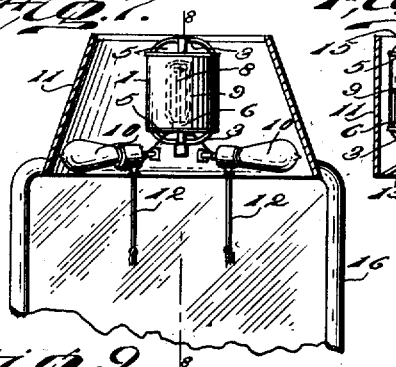
Figure 7, represents a front elevation of my invention adapted to be secured to the wall in combination with a mirror support.
Figure 8:
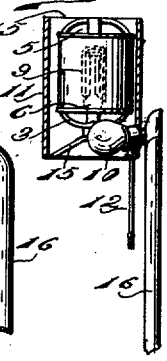
Figure 8, represents a vertical section on line 8—8 of Figure 7, the shade only being shown in section.
Figure 2:
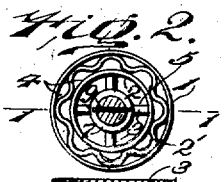
Figure 2, represents a horizontal sectional view of a heating unit and its flue taken on line 2—2 of Figure 1.
Figure 9:
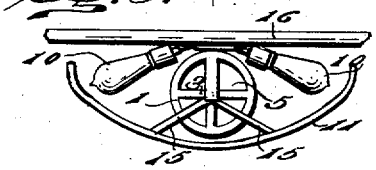
Figure 9, is a top plan view of Figure 7.

My novel combination of heating unit and electric light bulbs may be used on a ceiling, wall, floor or table. The portable floor device seen in Figure 3 and the table device, seen in Figure 6 each have weighted bases 14 to keep them stable, while the wall fixtures are attached to standard wall brackets or a mirrored support 16, as shown in Figures 7, 8 and 9.

In the floor lamp construction seen in Figure 3 it will be understood that the heating and lighting elements are supported from the weighted base 14 by the upright member 17, which may be solid or tubular. In the table lamp seen in Figure 6, I have shown the heating element and its adjuncts supported from the weighted base by the upright 18, the pair of lights 10 seen in said figure being supported on the branches 19, which preferably extend upwardly from a point near the base 14.

As a heating device, my invention posseses advantages over other devices, since I place the dangerous heating element in a safe position, out of the way of children and it is further thoroughly guarded from curtains, papers, and other inflammable articles, which might be accidentally ignited. There need be no unsightly electric stove planted about the floors, if a house is equipped with my novel devices as they are hidden within artistic shades. The thermal action draws most of the atmosphere surrounding the device upwardly through the cylinder 1, thereby heating the room evenly and thoroughly.

It will now be apparent that I have designed a new and useful combination of heating and lighting elements, which embodies the features of advantage enumerated as desirable in the statements of the invention and the above description, and while I have in the present instance shown and described preferred embodiments thereof which will give in practice satisfactory and reliable results, it is to be understood that such embodiments are susceptible of modification in various particulars without departing from the spirit or scope of the invention or sacrificing any of its advantages.

Figure 10:
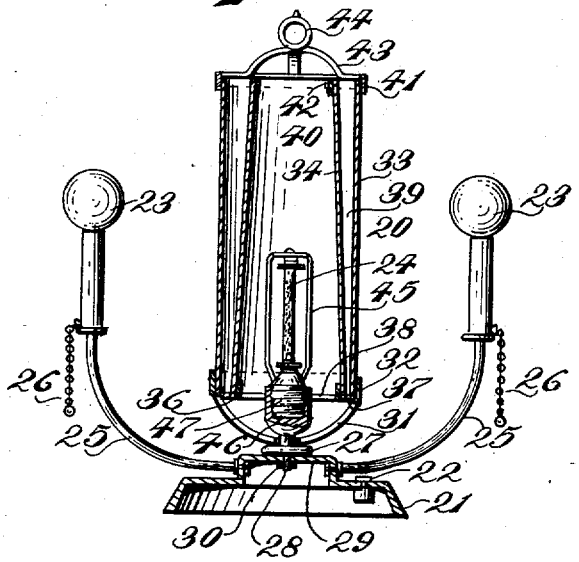
Figures 10 and 11 represent sectional and plan views of a modification.
Figure 11:
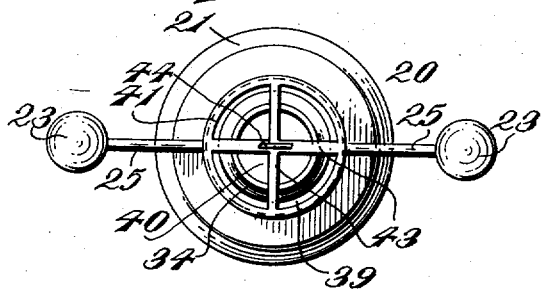

In Figures 10 and 11 I have shown another embodiment of my invention, wherein 20 designates my novel lighting and heating apparatus, which comprises a base 21 provided with a switch 22 of any suitable construction for controlling the flow of electric current to the lights 23 and the heating element 24, which latter is the same as the heating elements 8 already described. The lights 23 are supported upon the branches 25 and are provided with a pull chain switch 26 of the usual construction. 27 designates a plate having a threaded stem 28 passing through the top 29 of the base 21 and secured in position by the nut 30, said plate or disc 27 supporting the frame 31 which is composed of a plurality of arms whose outer ends carry the ring 32, within which are supported the outer cylinder 33, and the inner hollow asbestos member 34 which is preferably in the shape of a truncated cone. The member 34 can be composed of other non-conducting heat resisting material equivalent to asbestos.

The lower ends of the cylinder 33 and the cone 34 are concentrically arranged and supported by the apertured plate 36 which carries the ring 32, there being ports as indicated at 37 and 38, whereby a free upward circulation of hot air is permitted in the chambers 39 and 40.

The upper ends of the hollow members 33 and 34 are tied together by the pendant rings 41 and 42 of the upper member 43, which may consist of a plurality of bowed arms, surmounted by the eye 44, whereby the apparatus can be readily transported. The heating element 24 may be provided with the exterior frame 45 similar to the frame 9 already described, and the socket 46 supports the plug 47 which carries the heating element 24 and the member 45. I have purposely omitted showing the wiring connection common to the lamps 23, the heating element 24 and the switch 22 as these may be of any usual or conventional type and their arrangement and connection will be readily understood by those skilled in the art. The disc or plate 27 its threaded stem 28, and the nut 30 form a convenient means for assembling the heating element and its adjuncts with respect to the base 21, and their construction can be varied according to requirements. While I have shown the device in Figure 10 as equipped with the base 21 which may be weighted if desired, it will be apparent that said base can be of a reduced diameter and supported upon a suitable pedestal or the like, so that the device seen in Figure 1 will be suitable for a floor lamp, by merely mounting it upon a suitable pedestal.

Having thus described my invention what

I claim as new and desire to secure by Letters Patent, is:—

1. In a device of the character stated, a base, a socket supported thereon, an electric heating element vertically mounted in said socket, an outer chimney, an inner member surrounding said heating element, whereby an air space is formed between said chimney and member, means for securing the upper and lower ends of said chimney and member in concentric position and electric light supports extending from said base on either side of said chimney.

2. In a device of the character stated, a base, a socket supported thereon, an electric heating element vertically mounted in said socket, an outer chimney, an inner member surrounding said heating element, whereby an air space is formed between said chimney and member, means for securing the upper and lower ends of said chimney and member in concentric position, branches positioned above said base and forming electric light supports, and electric light sockets carried by said branches and so assembled and controlled by switches as to give heat or light or both simultaneously or independently.

3. In a device of the character stated, a base having supported thereon a socket, an electric heating element mounted vertically in said socket, an outer cylinder, an inner heat-resisting cone surrounding said heating element, and means for holding the upper and lower ends of said cylinder and cone in concentric relation.

4. In a device of the character stated, a base having supported thereon a socket, an electric heating element mounted vertically in said socket, an outer cylinder, an inner heat-resisting cone surrounding said heating element, means for securing the upper and lower ends of said cylinder and cone in concentric position, and branches extending from said base on each side of said cylinder and forming supports for electric lights.

5. In a device of the character stated, a base, a socket secured thereon, a heating element carried vertically by said socket, lower arms also supported from said base, inner and outer rings carried by said arms, an inner conical open ended non-conducting member, and an outer metallic cylinder having their lower edges supported on said rings, upper concentric rings for securing the upper ends of said cone and cylinder together, and a handle member secured to said upper rings.

6. In a device of the character stated, a base, a socket secured thereon, a heating element carried vertically by said socket, lower arms also supported from said base, inner and outer rings carried by said arms, an inner conical open-ended non-conducting member, and an outer metallic cylinder having their lower edges supported on said rings, upper concentric rings for securing the upper ends of said cone and cylinder together, a handle member secured to said upper rings, and branches extending upwardly from said base and carrying the electric lights.

7. In a combined convection heater and lighting lamp, a support, a vertically disposed heating unit carried by said support, a flue surrounding and assembled in spaced relation with said heating unit to directly heat the air substantially throughout the length of said flue, and an electric light mounted in proximity to said flue, said unit and light being so assembled and controlled as to give heat or light or both, simultaneously or independently.

8. In a combined convection heater and lighting lamp, a support, a vertically disposed electric heating unit on said support, a flue surrounding said unit, with the walls of the flue substantially parallel with the walls of the unit, and an electric light mounted in proximity to said flue, said unit and light being so assembled and controlled as to give heat or light or both, simultaneously or independently.

9. In a combined convection heater and lighting lamp, a support, an electric heating unit on said support, a flue, said unit being disposed within said flue between its ends to directly heat the air substantially throughout the length of the flue, and an electric light mounted in proximity to said flue, said unit and light being so assembled and controlled as to provide, simultaneously or independently, heat or light.

10. In a combined radiant convection heater and lighting lamp, a support, a socket thereon, a vertically disposed electric heating unit in said socket, a flue surrounding and extending at each end beyond said unit, and an electric light in proximity to said flue, said unit and light being assembled and controlled to provide simultaneously or independently, heat or light.

WILLIAM ALLEN BROWN.